United States Patent [19]
Hopkins

[11] 3,862,798
[45] Jan. 28, 1975

[54] AUTOMATIC REAR VIEW MIRROR ADJUSTER

[76] Inventor: Charles L. Hopkins, 86 Beechwood, Shelbyville, Ky. 40065

[22] Filed: Nov. 19, 1973

[21] Appl. No.: 417,276

[52] U.S. Cl. ............... 350/278, 74/501 M, 250/230, 350/267, 350/279, 350/307
[51] Int. Cl. ............................................ G02b 17/00
[58] Field of Search .......... 250/230, 267; 74/501 M; 350/268, 278, 279, 283, 160 LC, 307

[56] References Cited
UNITED STATES PATENTS

| | | | |
|---|---|---|---|
| 3,000,262 | 9/1961 | Rabinow et al. | 350/279 |
| 3,280,701 | 10/1966 | Donnelly et al. | 350/278 X |
| 3,614,210 | 10/1971 | Caplan | 350/278 |

*Primary Examiner*—Alfred E. Smith
*Assistant Examiner*—Saxfield Chatmon, Jr.
*Attorney, Agent, or Firm*—William R. Coffey

[57] ABSTRACT

A rear view mirror assembly comprising a reflective surface, and a liquid crystal assembly covering the reflective surface. The liquid crystal assembly comprises a thin layer of liquid nematic material sandwiched between rigid panes of transparent material, the rigid panes having a thin, transparent coating of conductive material thereon in uniform contact with the nematic material. The nematic material has a quiescent transparent state with no voltage applied and a turbulent opaque state when voltage is applied with the opaqueness being directly related to the applied voltage. A voltage source is supplied and a photocell or a similar light-responsive device is used for controlling the voltage output of the voltage source. The controlled output of the voltage source is applied to the coatings of conductive material. The photocell is effective, when light impinges thereon, to apply a voltage level to the nematic material.

6 Claims, 10 Drawing Figures

PATENTED JAN 28 1975 3,862,798

AUTOMATIC REAR VIEW MIRROR ADJUSTER

The present invention relates to automatically adjustable rear view mirror assemblies, and more particularly to the provision of a rear view mirror covered by a liquid crystal assembly which is rendered opaque or partially opaque by the application of voltage on the liquid crystal material.

Several different types of automatically adjustable rear view mirror assemblies have been suggested in the past. I believe that no one has, heretofore, suggested the use of a photocell controlled liquid crystal assembly for covering a reflective surface of a rear view mirror.

Liquid crystals have been known probably since the turn of the century. A basically simple liquid crystal assembly consists of two parallel glass plates with a drop of liquid crystal material sandwiched therebetween. A thin transparent conductive coating, such as a coating of tin oxide, is on each of the glass plates uniformly to contact the liquid crystal material. A sort of a parallel plate capacitor is, therefore, constructed with the liquid crystal material forming the dielectric. With no voltage applied across the conductive coatings, the liquid crystal material is quiescent and essentially transparent. When voltage is applied, the liquid crystal material becomes turbulent and, to an extent depending upon the level of the voltage, opaque. The opaqueness results from the liquid crystal material becoming turbulent and scattering the light. When the voltage field is removed, the liquid crystal material returns to its original quiescent, transparent condition.

The optoelectric property of turbulent scattering is often called dynamic scattering. Dynamic scattering is reported to be a condition peculiar only to a special group of materials in the class of liquid crystals called nematic materials. The molecular structures of nematic materials differ significantly from that of ordinary liquids in that, in nematic materials, the electric dipole movement, i.e., the resultant force set up in the molecule by the field, does not lie along the main molecular axis. Nematic molecules are long and cylindrically shaped and have oxygen-carbon appendages that cause the molecular moment to be at an angle with respect to the molecular axis. Because of this arrangement, the molecules cannot align with their dipole moment in the direction of the field when an electric field is applied to a thin film of this material.

The thickness of the liquid crystal compound, practically speaking, is extremely small on the order of 0.5 mil. Of course, in order for the conductive coatings which make contact with the liquid crystal material to be transparent, they must also be extremely thin. The whole liquid crystal assembly, therefore, may be, practically speaking, quite thin and limited only by the thickness of the two parallel glass plates required to give structural rigidity.

In one embodiment of my invention, a reflective surface may be formed on one of the two glass plates so that the liquid crystal assembly itself may be a mirror. In fact, in this embodiment, one of the two conductive coatings may be a nontransparent reflective coating to serve as the conductor as well as the reflective surface. For instance, aluminum, gold, silver or the like may be vacuum plated upon one of the glass plates to serve both as the conductive layer contacting the liquid crystal material and the reflective surface for the mirror.

In another embodiment of my present invention, the liquid crystal assembly including the two parallel plates is simply placed to cover a rear view mirror.

It is an object of my invention, therefore, to provide an adjustable rear view mirror which does not involve mechanically movable parts and the like, but which, instead, comprises a layer of liquid crystal material which is transparent in its quiescent state and opaque when voltage is applied thereto.

Another object of my present invention is to provide a control for a voltage source for use with such a liquid crystal assembly, the control including a light-responsive means effective, when a predetermined light level impinges thereon, to apply a corresponding voltage level to the liquid crystal compound.

Other objects and features of the present invention will become apparent as this description progresses.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
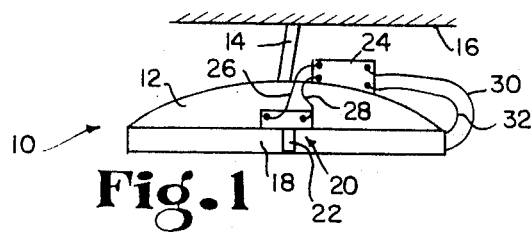
FIG. 1 is the top view of a rear view mirror on the windshield of an automobile with the liquid crystal assembly, photocell, and power control circuitry mounted thereon.
Figure 2:
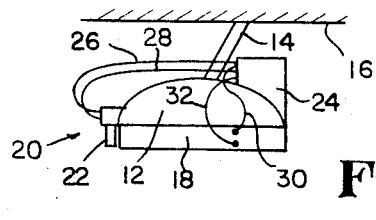
FIG. 2 is a side view taken from the right-hand side of FIG. 1.

Referring now to the drawings, and particularly to FIGS. 1 and 2, it will be seen that I have illustrated a rear view mirror assembly 10 comprising a rear view mirror 12 mounted upon a projecting rod 14 which is, in turn, conventionally cemented or otherwise attached to the windshield 16 of the automobile. A liquid crystal assembly 18 is mounted upon the mirror to cover its reflective surface, and a photocell assembly 20 is mounted upon the mirror. The photocell assembly may include a photocell 22 which is within a hollow open tube extending rearwardly toward the back of the car. The tube is a conventional means for providing a shield or a partial shield to prevent high intensity ambient light conditions from adversely affecting the operation of the overall system. The end of the tube facing the rear of the automobile is open such that the headlights of a following automobile will project light at the sensing surface of the photocell.

Mounted on the back side of the mirror 12 is a block 24 containing the control circuitry. Two lead lines 26, 28 connect the photocell assembly 20 to the control circuitry block 24 and another pair of lead lines 30, 32 connect the control circuitry to the liquid crystal assembly 18 and, as will be discussed hereinafter, to the conductive coatings of the liquid crystal assembly. It will be appreciated that the showing of the block 24 and the leads 26, 28, 30, 32 is merely illustrative and that, within the scope of the present invention, other types of electrical assembly techniques may well be used electrically to connect the photocell 22 to the liquid crystal assembly.

Referring now to FIGS. 3-10, several embodiments of my present invention will be discussed, like reference numerals indicating like parts. In all of the Figs., the reference numeral 38 indicates the positive voltage input terminal for the power source. Since it may be desirable to have a manual by-pass of the photocell 22, I provide a switch 40 connected in parallel with the photocell and in series with a resistor 41 which simulates the resistance of the photocell. The driver of the automobile may, therefore, render the liquid crystal assembly 18 opaque merely by closing the switch 40. In series with the photocell 22 (FIG. 3) is an adjustable resistor 42 and a fixed resistor 44 serving as resistance means. The resistance means and the photocell 22 provide a voltage divider network, the output voltage terminal of which is connected to the assembly 18 of the inside mirror as well as the assembly 18' of the outside mirror.

Figure 3:
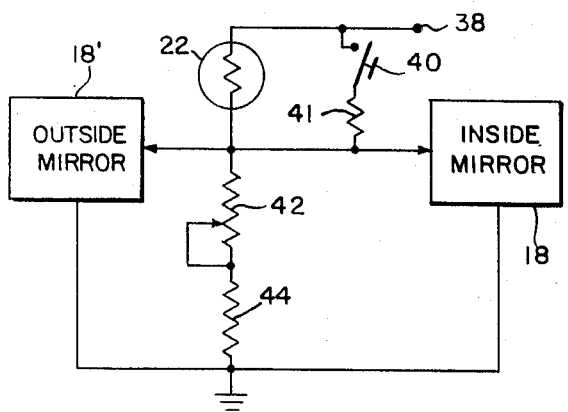
FIG. 3 is a schematic view of the control circuitry showing how the control may be applied to the outside rear view mirror as well as the inside rear view mirror.

The system of FIG. 3 is designed to enable the operator to change the sensitivity of the liquid crystal assembly by using the variable resistor 42 to change the resistor value of the divider network comprising the photocell, resistor 42 and resistor 44. By properly adjusting the resistor 42, the level of light required to produce the voltage level capable of rendering the liquid crystal material opaque or partially opaque may be established. This feature enables the individual driver to calibrate the system according to his own judgment. If the driver decides that he wishes to change the state of the mirror assembly even though there are no headlights from following automobiles, he can close the switch 40 to apply the voltage to the mirror assembly through resistor 41. The resistor 41 may be appreciably smaller in value than the photocell resistance and thus effectively shunt the control by the photocell.

Figure 4:
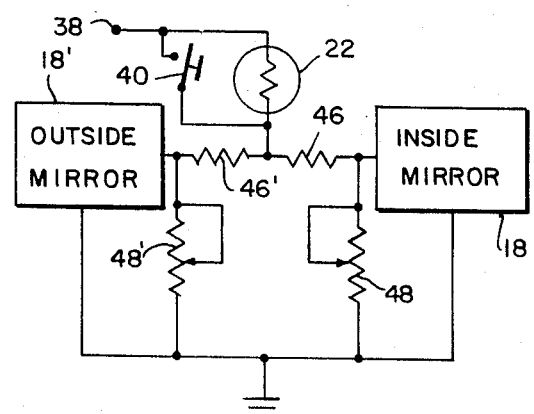
FIG. 4 is a schematic similar to FIG. 3 except that individual sensitivity adjustment circuits are provided for each of the two mirrors.

The schematic of FIG. 4 shows a structure similar to the structure of FIG. 3 except that each mirror assembly 18, 18' has its own sensitivity adjustment by means of a variable resistor 48, 48'. This sensitivity adjustment would be applicable in both the automatic mode and manual mode of operation. Particularly, in each leg of the network, the adjustable resistor 48, 48' is connected in series with a fixed resistor 46, 46' and then, further, in series with the photocell 22.

Figure 5:
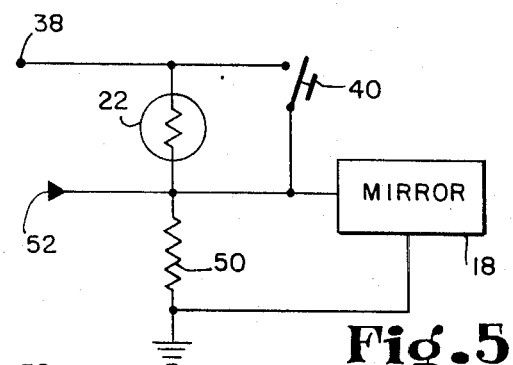
FIG. 5 is a schematic of the basic control circuit.

My basic control circuit, therefore, is depicted in FIG. 5 and includes a photocell 22 in series with resistive means 50 to provide a voltage divider network with an output terminal 52 connected to one side of the liquid crystal assembly 18, the other side of the liquid crystal assembly being connected to ground. When light impinges upon the photocell 22 (FIG. 5), it causes the resistance of that photocell to decrease. The voltage on the output terminal 52 is determined by the supply voltage and the ratio of the resistances of the photocell 22 and the resistive means 50. As light impinges upon the photocell 22, its resistance decreases causing the voltage on the terminal 52 to increase due to the resistive divider action. The control voltage output on the terminal 52 will increase to the extent that it will render the liquid crystal material opaque and thus prevent light from being reflected from the mirror. The opposite action occurs as light is removed from the photocell.

Figure 6:
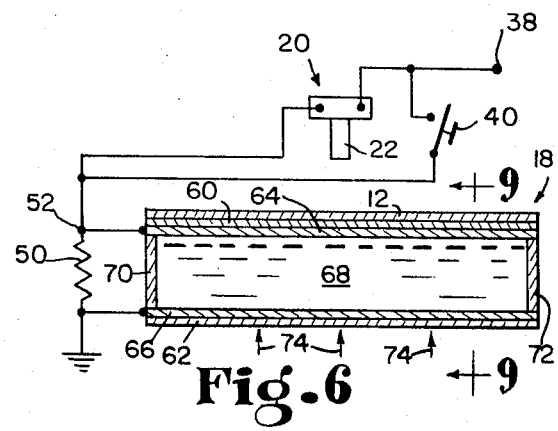
FIG. 6 is a diagrammatical view showing the control circuit of FIG. 5 hooked to the conductive layers of the liquid crystal assembly.

In the illustrative embodiment of FIG. 6, the liquid crystal assembly 18 is shown to include a pair of parallel flat glass plates 60, 62 covering the mirror 12, the inside surfaces of the plates having a thin transparent coating 64, 66 of conductive material thereon. The conductive material may be a material such as tin oxide. Sandwiched between the conductive coatings 64, 66 is the layer of liquid crystal material 68. A spacer frame extends about the assembly between the plates, the frame members being indicated at 70, 72. The spacer frame may be constructed from polymeric materials such as teflon. The spacer frame is, of course, extremely thin for the purpose of keeping the thickness of the active area within a range of, for instance, 6 to 25 microns.

The basic structure of such a liquid crystal assembly and the nature of the liquid crystal material or nematic material as it is called is disclosed, for instance, in the July 6, 1970 publication of *ELECTRONICS* at pages 64-70.

Electrodes are provided on the conductive coatings 64, 66 so that the conductive coatings can be connected to the circuitry, one of the coatings being connected to the ground terminal and the other of the coatings being connected to the output terminal of the divider network comprising the photocell 22 and resistor 50.

Figures 9, 10:
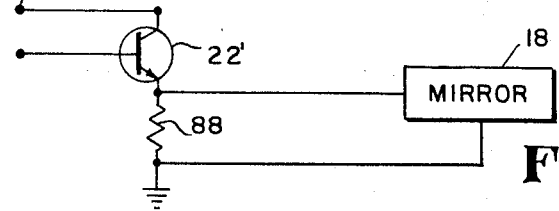
FIG. 9 is a sectional view taken generally along the lines 9—9 in FIG. 6.
FIG. 10 is a sectional view similar to FIG. 9 except that it shows one of the conductive surfaces serving as the reflective surface to provide a mirror.

In the embodiments of FIGS. 6 and 9, the assembly 18 covers the rear view mirror 12 which provides the reflective surface either on its front surface or rear surface as is conventional in mirror construction practices. When the liquid crystal material 68 becomes partially opaque, the light projected at the reflective surface of the mirror 12 as indicated by the arrows 74 is at least partially scattered such that it will not be reflected back into the driver's eyes. When the liquid crystal material 68 becomes completely opaque, of course, no light will penetrate therethrough to be reflected from the reflective surface of the mirror 12.

In the embodiment of FIG. 10, the assembly 18' itself is a mirror as well as a liquid crystal assembly. The conductive coating 64' is also the reflective coating such that, when the material 68 is transparent in its quiescent state, light projected at the reflective surface of the coating 64' will be reflected toward the driver of the automobile. The amount of light reflected toward the driver will, therefore, be dependent upon the degree of opaqueness of the material 68.

Figure 7:
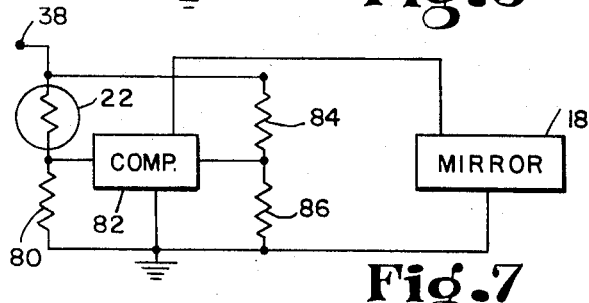
FIG. 7 is a schematic view of a control circuit utilizing a comparator controlling the time it takes the mirror to become opaque when light impinges upon the photocell.
Figure 8:
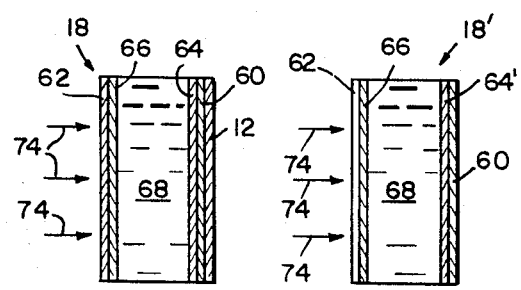
FIG. 8 is a schematic of another embodiment utilizing a light-actuated transistor as the light-responsive means.

It will be appreciated that, if the resistance of the photocell changes slowly, the voltage on the terminal 52 of the divider network will also change slowly such that the liquid crystal material will gradually go from the transparent state to the opaque state. If this condition is undesirable, then a threshold detector or comparator such as shown in FIG. 7 may be used between the junction of the photocell 22 and its series resistor 80 and the assembly 18. In FIG. 7, I show a comparator 82 and additional resistors 84, 86. Once the reference voltage of the comparator 82 is exceeded, the control voltage necessary to render the assembly 18 opaque is suddenly applied to the assembly and thus the time spent in the intermediate region would be drastically shortened to the extent that it could not be detected by the eye. The above condition of slowness of change could also be corrected, for instance, by using a higher gain device than a photocell. For example, as shown in FIG. 8, I may use a phototransistor 22', the emitter-collector path of which is in series with the series resistor 88.

I claim:

1. A rear view mirror assembly comprising a plate providing a reflective surface, a layer of liquid crystal compound in front of said reflective surface, said compound being essentially transparent in its quiescent state and opaque when voltage is applied thereto, a voltage source, light-responsive means controlling said voltage source, and electrical means for connecting said voltage source to said compound, said light-responsive means being effective, when a predetermined light level impinges thereon, to apply a corresponding voltage level to said compound, said light-responsive means including a photocell having a resistance which decreases when light impinges thereon, said electrical means including resistive means connected in series with said photocell to provide a voltage divider network across said voltage source, said network having an output voltage terminal connected to one side of said compound and a ground terminal connected to the other side of said compound.

2. The invention of claim 1 in which said resistive means includes an adjustable resistor such that the sensitivity of the assembly can be adjusted to establish said predetermined level of light.

3. A rear view mirror assembly comprising a plate providing a reflective surface, a layer of liquid crystal compound in front of said reflective surface, said compound being essentially transparent in its quiescent state and opaque when voltage is applied thereto, a voltage source, light-responsive means controlling said voltage source, and electrical means for connecting said voltage source to said compound, said light-responsive means being effective, when a predetermined light level impinges thereon, to apply a corresponding voltage level to said compound, and a manually-operable switch connected in parallel with said light-responsive means such that a voltage can be manually applied to said compound, by-passing said light-responsive means.

4. A rear view mirror assembly comprising means providing a reflective surface, and a liquid crystal assembly covering said reflective surface, said liquid crystal assembly comprising a thin layer of liquid nematic material sandwiched between rigid panes of transparent material, said rigid panes having a thin transparent coating of conductive material thereon in uniform contact with said nematic material, said nematic material having a quiescent transparent state with no voltage applied and a turbulent opaque state when voltage is applied with the opaqueness being directly related to the applied voltage, a voltage source, light-responsive means for controlling the voltage output of said voltage source, and electrical means for connecting said voltage source to said coatings of conductive material, said light-responsive means being effective, when light impinges thereon, to apply a corresponding voltage level to said nematic material, said light-responsive means including a photocell having a resistance which decreases when light impinges thereon, said electrical means including resistive means connected in series with said photocell to provide a voltage divider network across said voltage source, said network having an output voltage terminal connected to one of said conductive coatings and a ground terminal connected to the other of said conductive coatings.

5. The invention of claim 4 in which said resistive means includes an adjustable resistor such that the sensitivity of the assembly can be adjusted selectively to establish the amount of light required to develop said corresponding voltage.

6. A rear view mirror assembly comprising means providing a reflective surface, and a liquid crystal assembly covering said reflective surface, said liquid crystal assembly comprising a thin layer of liquid nematic material sandwiched between rigid panes of transparent material, said rigid panes having a thin transparent coating of conductive material thereon in uniform contact with said nematic material, said nematic material having a quiescent transparent state with no voltage applied and a turbulent opaque state when voltage is applied with the opaqueness being directly related to the applied voltage, a voltage source, light-responsive means for controlling the voltage output of said voltage source, and electrical means for connecting said voltage source to said coatings of conductive material, said light-responsive means being effective, when light impinges thereon, to apply a corresponding voltage level to said nematic material, said light-responsive means including a light-actuated transistor having an emitter-collector path connected between said voltage source and one of said conductive coatings, said other conductive coating being connected to ground, said electrical means including resistive means connected between the emitter of said transistor and ground.

* * * * *